Dec. 25, 1962     J. R. MARCHANT     3,070,687
HEADLAMP COVER

Filed March 7, 1960     5 Sheets-Sheet 1

INVENTOR.
Joseph R. Marchant
BY
G.E. McGlynn Jr.
ATTORNEY

Dec. 25, 1962  J. R. MARCHANT  3,070,687
HEADLAMP COVER
Filed March 7, 1960  5 Sheets-Sheet 3

INVENTOR.
Joseph R. Marchant
BY
ATTORNEY

Dec. 25, 1962 J. R. MARCHANT 3,070,687
HEADLAMP COVER

Filed March 7, 1960 5 Sheets-Sheet 4

INVENTOR.
Joseph R. Marchant
BY
ATTORNEY

Dec. 25, 1962 J. R. MARCHANT 3,070,687
HEADLAMP COVER

Filed March 7, 1960 5 Sheets-Sheet 5

INVENTOR.
Joseph R. Marchant
BY
G.E. McGlynn Jr.
ATTORNEY

3,070,687
Patented Dec. 25, 1962

3,070,687
HEADLAMP COVER
Joseph R. Marchant, Detroit, Mich., assignor to General Motors Corporation, Detroit, Mich., a corporation of Delaware
Filed Mar. 7, 1960, Ser. No. 13,326
3 Claims. (Cl. 240—7.1)

This invention pertains to a movable cover for lamps and, in particular, for the headlamps of an automobile.

The manner of mounting modern day automobile headlamps presents several problems. In the first place, such lamps are exposed to rain, sleet, ice, snow, road grime and the like at all times, even during daylight hours when they are not required to be used, thereby resulting in a coating or film on the lamp lens which prevents optimum illumination from being realized. Furthermore, such exposed lamps place limitations on the styling of the front fenders or grille portions of vehicles.

It is a principal object and feature of this invention to provide, in combination with a fixed automobile headlamp, a cover which may be disposed in front of the headlamp to conceal the latter when it is not in use, and which may be moved or retracted to expose the headlamp when it is to be used.

It is yet another object and feature of this invention to provide such a movable headlamp cover characterized by a relatively simple and compact linkage means for guiding the cover between a position covering the headlamp and a position exposing it for use.

It is yet another object and feature of this invention to provide, in combination with the aforementioned headlamp cover, primary operating means, such as power operated means, selectively operable to move the cover between its positions, and secondary operating means, such as manually operable means, for moving the cover independently of operation of the primary or power means aforementioned.

These and other objects of the invention, and the manner in which they are attained, will become more apparent hereinafter from a consideration of the accompanying drawings in which.

Figure 1:
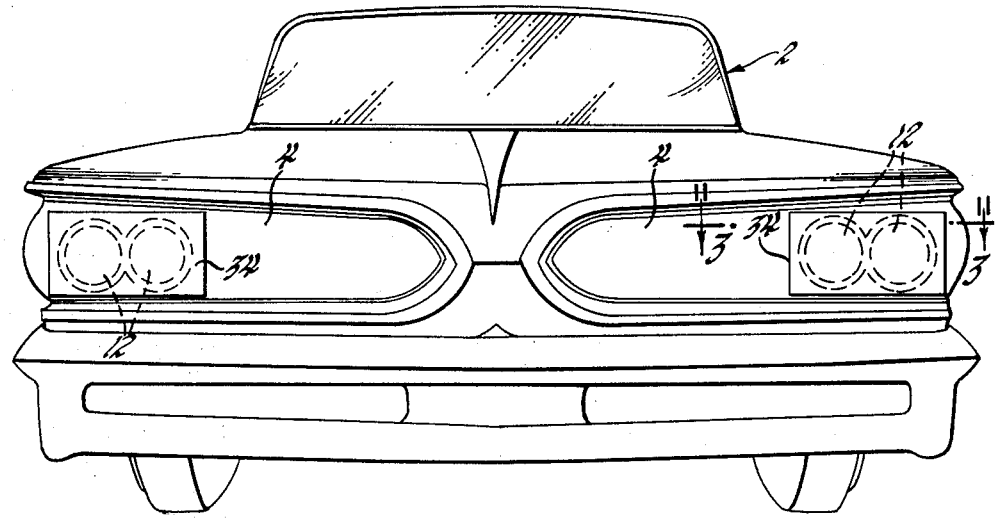
FIGURE 1 is a front elevation of a vehicle equipped with the invention.
Figure 2:
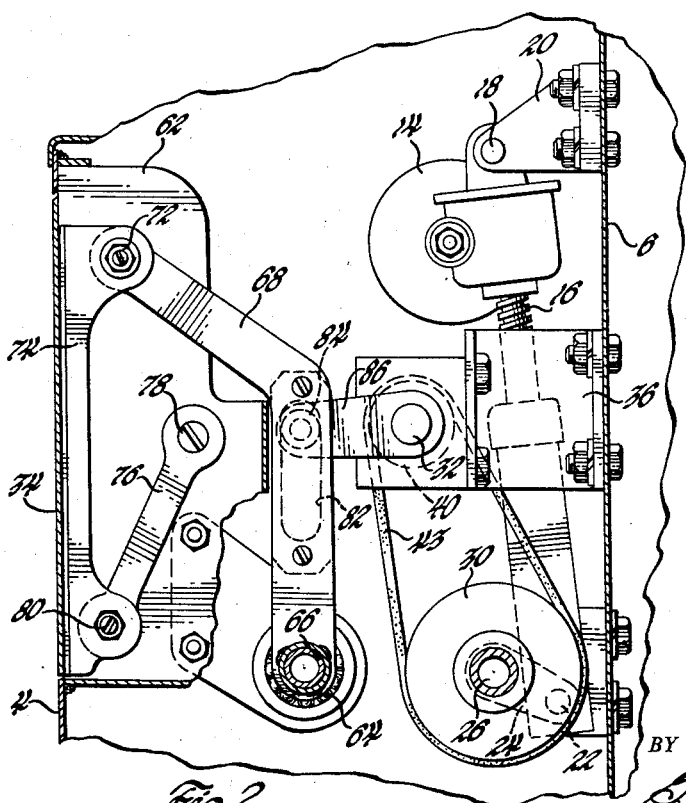
FIGURE 2 is a view taken on line 2—2 of FIGURE 3.
Figure 3:
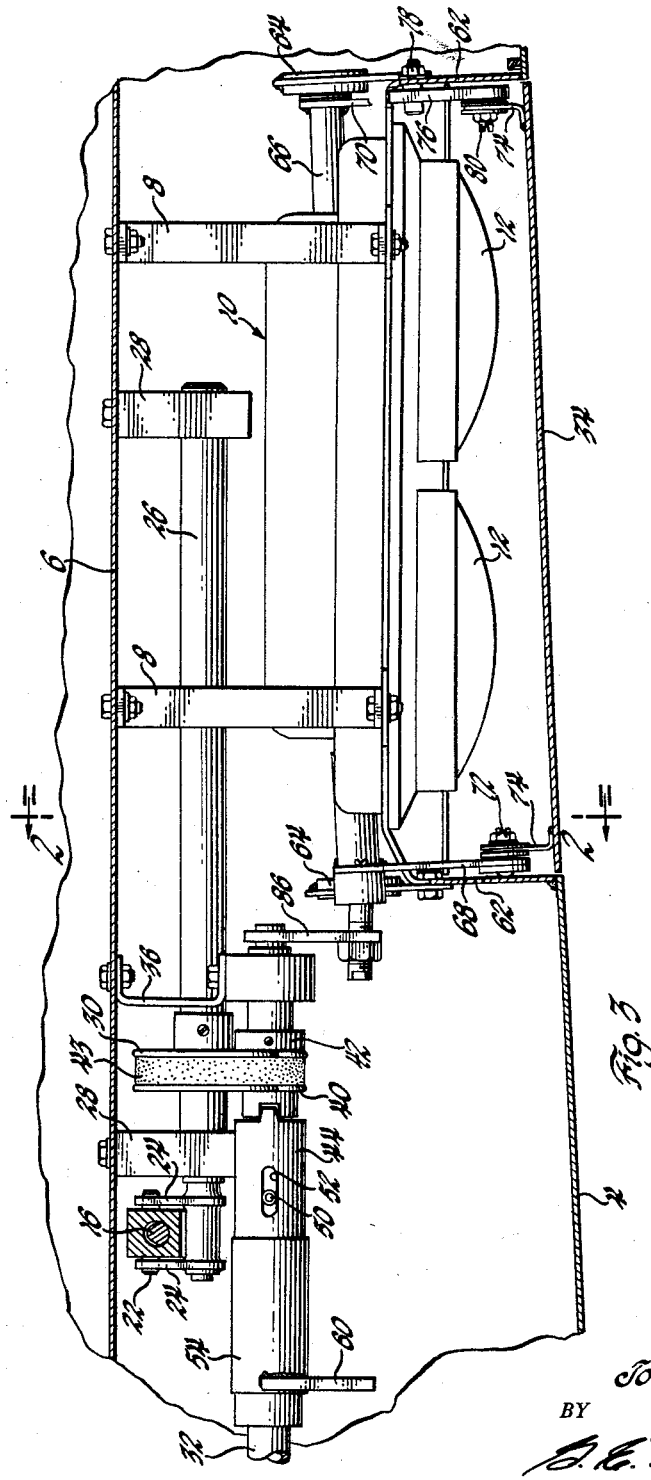
FIGURE 3 is an enlarged fragmentary sectional view taken on line 3—3 of FIGURE 1 illustrating a preferred embodiment of the invention with the headlamp cover concealing the headlamps.
Figure 4:
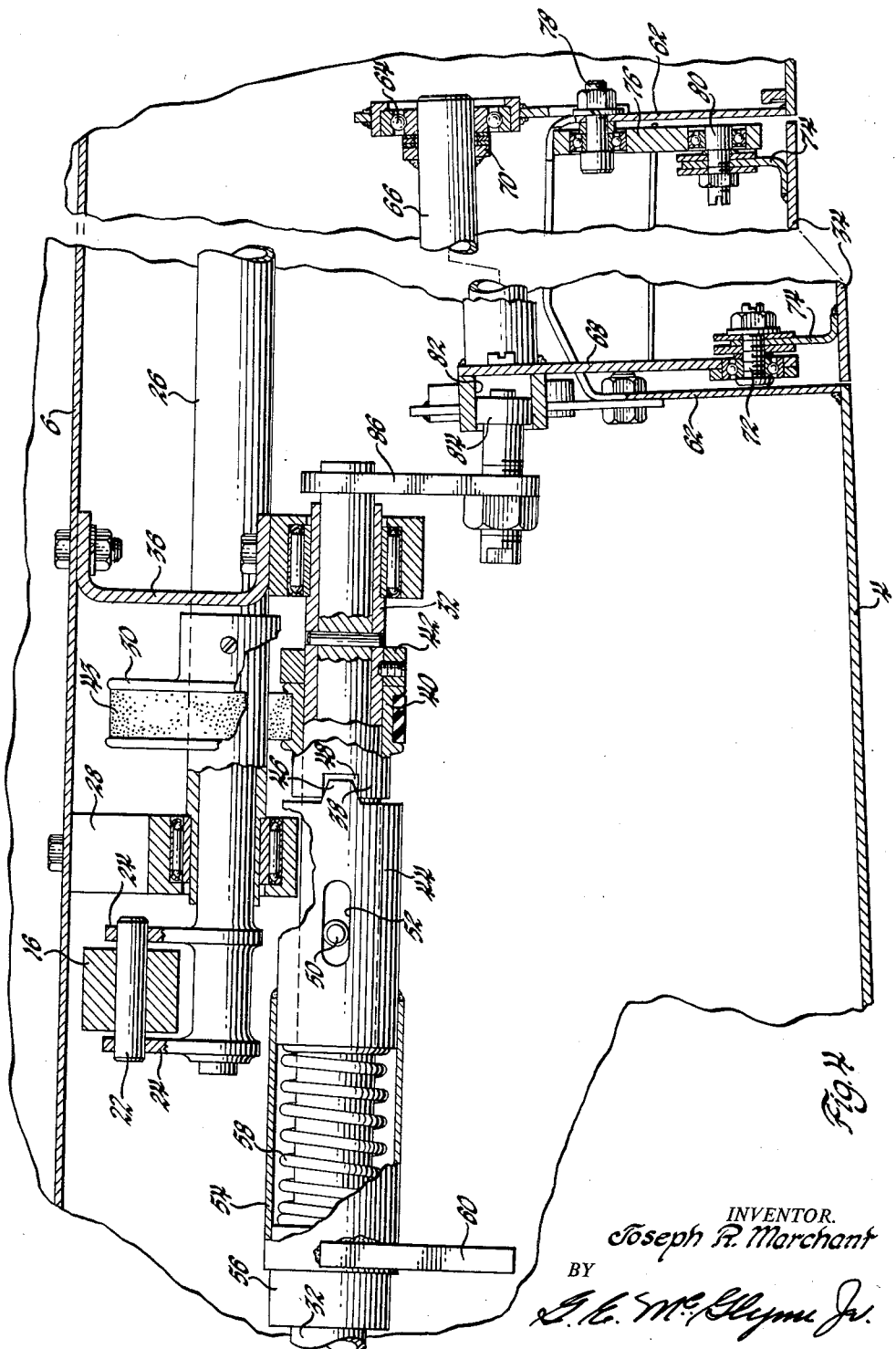
FIGURE 4 is an enlarged fragmentary view of FIGURE 3 showing certain details of the construction.

Referring now to a preferred embodiment of the invention as shown particularly in FIGURES 1 through 5, an automobile 2 is shown as comprising the usual front grille extending transversely of the vehicle and including an outer grille section or panel 4 to each side of the vehicle center line, and a rearward of inner transversely extending support wall 6 rigidly secured to the vehicle. The support brackets 8 each have one end rigidly connected to the wall 6 while the other ends thereof firmly support the conventional headlamp mounting assembly 10 including the dual headlamps 12 which, as shown particularly in FIGURE 3, are recessed behind the plane of grille panels 4.

A suitable power operated motor means, herein shown to comprise a conventional split-shunt reversible electric motor 14 suitably supported on wall 6, drivingly engages through suitable reduction gearing a conventional screw jack 16 which has its upper end pivotally connected at 18 to a bracket 20 rigidly secured to the support panel 6, and depends downwardly for pivotal connection at 22 between drive arms 24 formed integral with or otherwise rigidly secured to a transversely extending primary drive shaft 26 suitably rotatably supported upon the mounting brackets 28 which, in turn, are supported from the panel 6. The hub of a relatively large primary drive pulley 30 is rigidly secured to the primary drive shaft 26. The primary drive shaft 26 extends only a portion of the width of the vehicle, and supplies power to a secondary shaft 32 which is common to both of the retractable covers shown in FIGURE 1 of the drawings and to be described.

The secondary drive shaft 32 extends transversely of the vehicle above the primary drive shaft so as to have each of its ends disposed adjacent the respective headlamp covers 34. This shaft forms a common drive means for operating each of the headlamp covers. The secondary drive shaft is rotatably supported at each of its ends by means of a bearing construction supported by a bracket 36 mounted on the panel 6 and, as design dictates, may be similarly supported at various points intermediate its ends. The sleeve or hub 38 of a smaller and driven pulley 40 is freely rotatably mounted about the secondary drive shaft 32, and is axially located in one direction or to the right in FIGURE 4 by means of a collar 42 locked to the secondary drive shaft 32. Drive belt 43 extends between pulleys 30 and 40. A tubular clutch sleeve 44 is also mounted about the secondary drive shaft, and includes one or more teeth 46 adapted to dog into or clutchingly engage a corresponding number of notches 48 in the pulley hub 40. Suitable means, such as one or more pins or keepers 50 rigidly secured to the secondary drive shaft 32 and riding within one or more elongate axial slots 52 in the clutch sleeve 44, locks the clutch sleeve non-rotatably to the secondary drive shaft while permitting axial shifting movement thereon. A tube 54 is rigidly secured as by welding to one end of the clutch sleeve 44, and extends about a bushing 56 and is freely rotatable relative thereto to form a chamber enclosing a coiled clutch-operating spring 58. It will be understood that the spring 58 normally biases the clutch sleeve 44 into clutching engagement with the pulley sleeve or hub 38. A handle 60, freely accessible upon lifting the hood of the vehicle, is rigidly secured to the tubular member 54. This handle permits manual retraction of the clutch sleeve 44 from engagement with the pulley sleeve 38, and rotation of the secondary drive shaft 32 completely independently of the power operating means.

As previously alluded to, the secondary drive shaft 32 is adapted at each of its ends to control the operation of the respective headlamp covers 34. Inasmuch as the structure associated with each end of shaft 32 and each cover 34 to accomplish this purpose is identical, only that associated with the left cover and headlamps will be described.

A rearwardly projecting support panel 62 is rigidly secured to the grille structure 4 on each side of the recessed opening in which the headlamp assemblies 10 are mounted. On each of these panels there is mounted a bearing assembly 64 which are axially aligned with each other. A driven shaft 66 is rotatably journaled within the bearings 64, and is rigidly connected at each of its ends with one end of each of the driven links 68 and 70 of generally arcuate or bell-crank configuration. The other end of each link is pivotally connected at aligned points 72 to a bracket 74, one of which is rigidly mounted at each lateral edge of the headlamp cover 34. A pair of guide links 76 are also provided, each having one end pivotally connected to a respective support panel 62 at 78 and the other end pivotally connected to a respective mounting bracket 74 at 80.

An elongate cam follower slot 82 is mounted on the laterally inboard driven link 68 so as to receive a cam roller 84 rotatably supported upon the free end of a crank or drive arm 86 rigidly secured to the end of the secondary drive shaft 32. As now will be apparent, rotation of the secondary drive shaft 32 results in rotation of the drive or crank arm 86, driven link 68 and driven link 70 through shaft 66, and guide links 76 from a position shown in FIGURE 2 in which the cover 34 conceals the headlamps to the position shown in FIGURE 5 in which the cover is retracted. It will also be noted that in either the FIGURE 2 or FIGURE 5 position, the axis of the crank or drive arm 86 is substantially at a right angle to the axis of follower slot 82 thereby providing an over-center condition locking the cover in its selected position.

Figure 5:
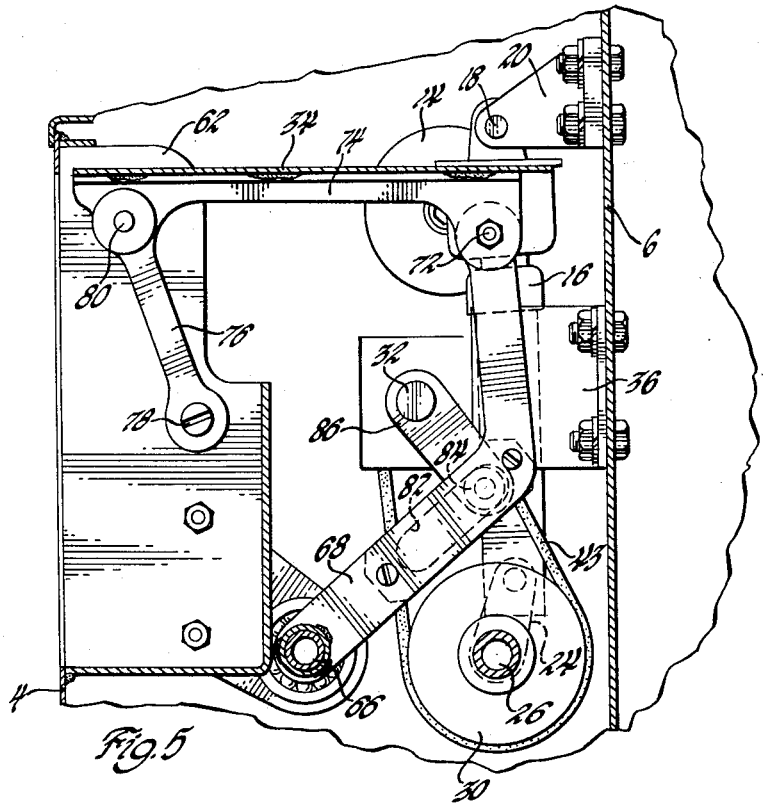
FIGURE 5 is a view corresponding to FIGURE 2, but showing the headlamp cover in a retracted position.

The operation of the foregoing structure will now be described. With the cover, linkage and other components disposed as shown in FIGURE 2 thereby concealing the headlamps, the electric motor 14 and screw jack 16 may be selectively actuated from a remote position within the vehicle so as to contract the jack and pivot the primary drive shaft in a counterclockwise direction as viewed in FIGURES 2 and 5. This motion is transmitted through the pulley construction to the secondary drive shaft 32 which likewise rotates counterclockwise to move the cam roller 84 along the follower slot 82. As this action takes place, the drive links 68 and 70 are pivoted clockwise about the axis of the shaft 66 while the guide links 76 guide the lower edge of the cover. The relative arcs described by the pivot points 72 and 80 cause a rapid retraction of the leading or upper edge of the cover, and an accentuated swinging movement of the lower or trailing edge of the cover so as to dispose the latter in a substantially horizontal position within the recessed opening and above the headlamps as shown in FIGURE 5. Naturally, the structure operates reversely in returning the cover to its FIGURE 2 position.

If for any reason, such as failure of the power operating motor means 14, it should be desired to move the headlamp cover between the positions shown in FIGURES 2 and 5, the manually operable handle 60 may be grasped to declutch the sleeve 44 from the pulley 40 and then rotated in the proper direction to rotate secondary drive shaft 32 to drive the cover.

Figure 10:
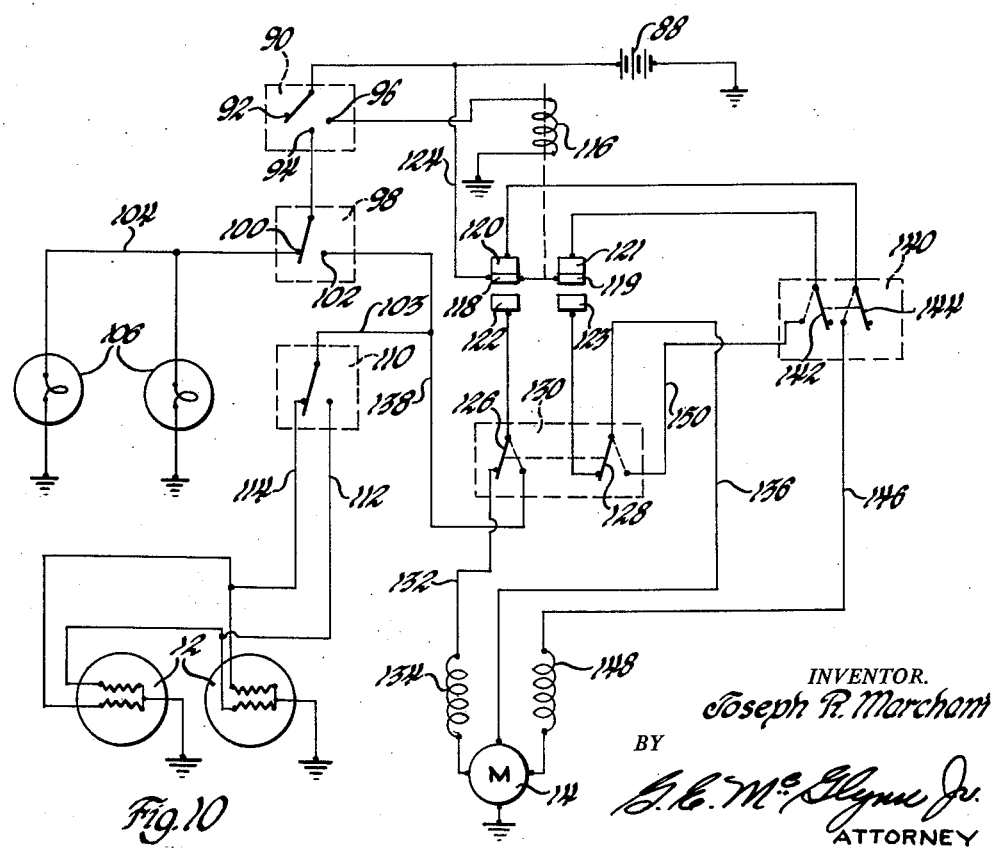
FIGURE 10 is a diagram of the circuit for controlling the cover operation in the embodiment of FIGURES 1 through 5.

The circuitry for controlling selective power operation of the headlamp covers in conjunction with operation of the headlamps is shown in FIGURE 10. The circuitry comprises a source of electric power such as a vehicle battery 88 connected in series with the manually operable master control switch 90 located within the vehicle passenger compartment and having an "off" contact 92, a parking lamp contact 94 and a headlamp and cover control contact 96. The parking lamp contact 94 is connected through the manually operable auxiliary switch 98 which has a parking lamp contact 100 and a headlamp contact 102. Contact 100 is connected through the conductor 104 to the parking lamps indicated at 106. The headlamp contact 102 of the auxiliary switch 98 is connected to the headlamp dimmer switch 110 which functions in a conventional manner in connection with the conductors 112 and 114 to energize selectively a particular filament of headlamps 12. The auxiliary switch 98 is normally disposed in the position shown in the drawings so that, upon closing the park contact 94 of switch 90, the parking lights will be energized through the auxiliary switch. However, as a safety measure to be referred to hereinafter, it will be apparent that with the control switch 90 closed on parking contact 94, the auxiliary switch 98 may be moved to the headlamp contact 102 thereby independently energizing the headlamps through the conductor 103 without the use of the circuitry to be described.

When the control switch 90 is moved to close the contact 96 a circuit is made through the relay 116 thereby moving the contacts 118 and 119, which are normally closed on the contacts 120 and 121, into engagement with the contacts 122 and 123. At this time, motor circuits are made from the battery 88 through the conductor 124, contacts 118, 122 and 119, 123 and the switch members 126 and 128 of the up-limit switch 130 controlled by the cover 34. Switch members 126 and 128 are in the full line position of FIGURE 10 with the cover down or in the FIGURE 2 position. More specifically, a circuit is made from switch member 126 through conductor 132 to the winding 134 of the reversible split-shunt motor 14, and from the switch member 128 through the conductor 136 to the armature of the motor. The motor is then actuated to move the cover from the FIGURE 2 position to that shown in FIGURE 5, at which time the up-limit switch 130 is disposed in the dotted line position shown in FIGURE 10 establishing a circuit from the switch member 126 through the conductors 138 and 103 and headlamp dimmer switch 110 to headlamp 12 which are illuminated, and the motor 14 is de-energized.

With the cover in the FIGURE 5 position, the down-limit switch 140 comprising the movable switch members 142 and 144 has moved from the full line position of FIGURE 10 and is disposed in the dotted line position thereof. When the control switch 90 is moved from the contact 96 to either the parking lamp contact 94 or to the "off" contact 92, the relay 116 is de-energized thereby resulting in closure of the contacts 118 and 119 upon the contacts 120 and 121. The circuit is broken through switch member 126 of up-limit switch 130 and the headlamps 12 are de-energized. Additionally, power flows from the contact 120 through the down-limit switch member 144 in the dotted line position and conductor 146 to the winding 148 of the motor. Similarly, power flows from the contact 121 to the other down-limit switch member 142 in the dotted line position, conductor 150, through the up-limit switch member 128 in the dotted line position and conductor 136 to the armature of the motor, thereby reversing operation of the latter for movement of the cover to the FIGURE 2 position. When the cover is fully closed, the limit switches 130 and 140 are returned to the full line positions of FIGURE 10, and are conditioned for a new cycle of operation as aforedescribed.

Reference will now be made to FIGURES 6 through 9 and another embodiment of the invention in which the primary power operated means for moving covers 34 is replaced by a manually operable means controlled from within the vehicle passenger compartment. More specifically, a primary manually operable means is employed to impart rotation to primary drive shaft 26 in the manner previously described with respect to the power operated means including motor 14 and jack 16. Otherwise, the drive from primary shaft 26 to secondary shaft 32 and covers 34 remains the same and, accordingly, like numerals are employed in this embodiment of the invention to indicate parts corresponding to those previously described.

Figure 6:
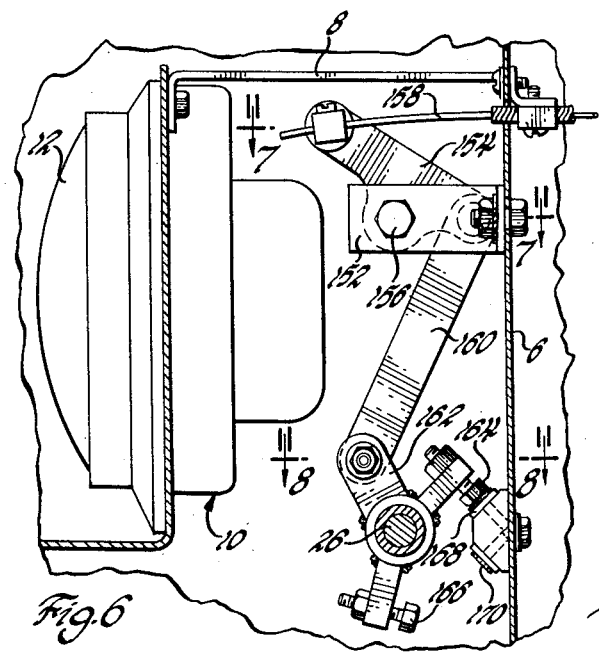
FIGURE 6 is a view corresponding generally to FIGURE 2, but showing another embodiment of the present invention.
Figure 7:
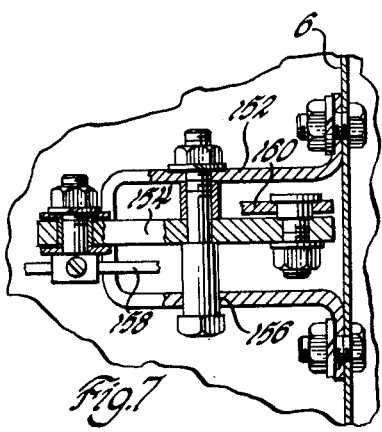
FIGURE 7 is a view taken on line 7—7 of FIGURE 6.
Figure 8:
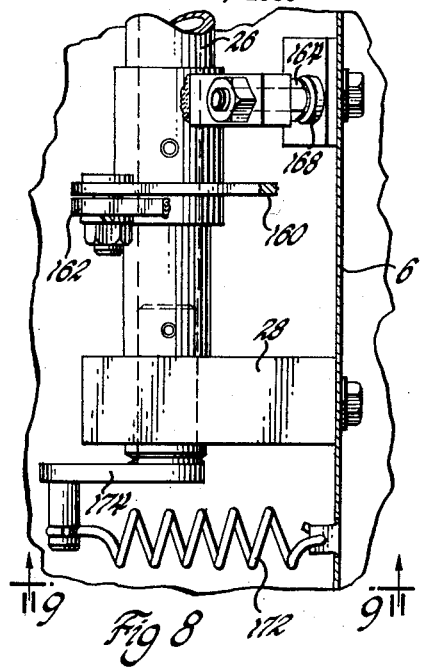
FIGURE 8 is a view taken on line 8—8 of FIGURE 6.

The primary manual operating means aforementioned comprises a substantially U-shaped support bracket 152 rigidly secured to the panel 6 and adapted to rotatably support the drive lever 154 on the pivot axis 156. A push-pull type flexible cable 158 is rigidly connected to one end of the drive lever 154, while the other end of the latter is pivotally connected to a drive link 160 having its opposite end pivotally connected to a drive arm 162 suitably rigidly secured to the primary drive shaft 26. A pair of radially projecting spaced stops 164 and 166 are adapted to cooperate with the stop bumpers 168 and 170 supported from the panel 6. An over-center spring 172 is connected to the support panel 6 and engages the free end of an arm 174 rigidly connected to the laterally outboard end of the primary drive shaft 26. With the cover 34 in the FIGURE 2 or closed position, the operating mechanism will be in the position shown in FIGURES 6 through 9 and in which spring 172 is over-center to one side of the axis of primary drive shaft 26. When the cover is moved from the FIGURE 2 to the FIGURE 5 or open position in a manner to be described, arm 174 in FIGURE 9 rotates counterclockwise causing spring 172 to move over-center to the opposite side of the axis of shaft 26. Thus, spring 172 acts to maintain the cover in a fully closed or open position, irrespective of the influence of vibrations and the like which might tend to dislodge the cover from one of these preselected positions. Referring to FIGURES 3, 6 and 8, it may be seen that the structure aforedescribed is located adjacent one or the other of the supports 28 for the primary support shaft 26.

Figure 9:
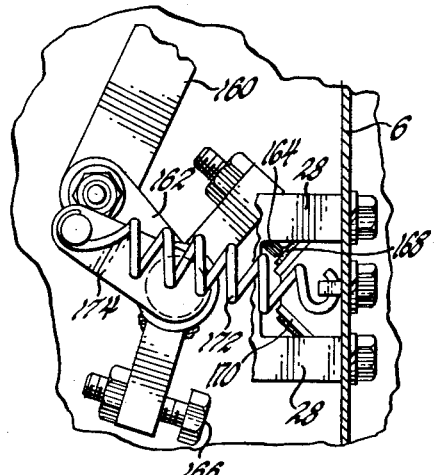
FIGURE 9 is a view taken on line 9—9 of FIGURE 8.

In operation, when it is desired to retract the headlamp cover from the FIGURE 2 to the FIGURE 5 position, the cable 158 will be pulled or moved to the right in FIGURE 6 thereby pivoting the primary drive shaft 26 counterclockwise as aforedescribed until the stops 166 and 170 engage, at which time the cover 34 is disposed in the FIGURE 5 position and over-center spring 172 moves from the FIGURE 9 position to the opposite side of the axis of shaft 26. Consequently, when it is desired to return the cover 34 to the FIGURE 2 position, the cable 158 is pushed or moved to the left in FIGURE 6 thereby permitting the primary drive shaft to rotate clockwise. This movement will continue until such time as the stops 164 and 168 engage, which occurs when the cover is in the fully closed position of FIGURE 2 and the spring 172 is disposed in the FIGURE 9 position. As will be obvious, motion is imparted from the primary drive shaft 26 to the secondary drive shaft 32 to the covers 34 in the manner previously described with respect to the first preferred embodiment.

While but two forms of the invention have been selected for a descriptive illustration thereof, other forms will now be apparent to those skilled in the art. Therefore, the embodiment shown in the drawings are merely for illustrative purposes, and are not intended to limit the scope of the invention which is defined by the claims which follow.

I claim:

1. In combination with a vehicle having a headlamp recessed in an opening in the front end thereof, a movable cover for said opening, a driven link having one end pivotally connected to said vehicle and the other end pivotally connected to said cover, a guide link having one end pivotally connected to said vehicle and the other end pivotally connected to said cover, said driven and guide links being actuable to move said cover between a position closing said opening and a position exposing said headlamp, a cam follower slot in said driven link, a rotatable drive shaft including a cam drivingly engaging said driven link within said follower slot, said cam being movable longitudinally of said follower slot as said drive shaft is rotated to move said cover between said positions, and means for selectively rotating said drive shaft.

2. In combination with a vehicle having a headlamp recessed in an opening in the front end thereof, a movable cover for said opening, a driven link having one end pivotally connected to said vehicle and the other end pivotally connected to said cover, a guide link having one end pivotally connected to said vehicle and the other end pivotally connected to said cover, said driven and guide links being actuable to move said cover between a position closing said opening and a position exposing said headlamp, a cam follower slot in said driven link, a rotatable drive arm including a cam roller drivingly engaging said driven link within said follower slot, said cam roller being movable longitudinally of said follower slot as said drive arm is rotated to move said cover between said positions, said cam roller having two extreme positions within said slot corresponding to said positions of said cover in which said drive arm goes over-center relative to said driven link to lock said cover in a selected position, and means for selectively rotating said drive arm.

3. In combination with a vehicle having a headlamp recessed in an opening in the front end thereof, a movable cover for said opening, a driven link having one end pivotally connected to said vehicle and the other end pivotally connected to said cover, a guide link having one end pivotally connected to said vehicle and the other end pivotally connected to said cover, said driven and guide links forming the sole support for said cover and being pivotable to move said cover in an arcuate path between a position closing said opening and a position within said opening and over said headlamp, a cam follower slot in said driven link, a drive shaft rotatably supported transversely of the front end of said vehicle, a drive arm rigidly secured to said shaft, a cam roller rotatably supported on the free end of said drive arm and drivingly engaging said driven link within said follower slot, said cam roller being movable longitudinally of said follower slot as said cover is moved and having two extreme positions within said slot in which said drive arm goes over-center relative to said driven link to lock said cover in a selected position, power-operated means for selectively rotating said drive shaft and including a driven sleeve freely rotatably mounted upon said drive shaft, a clutch sleeve axially shiftably non-rotatably mounted on said drive shaft, yieldable means normally urging said clutch sleeve into axial clutching engagement with said driven sleeve, and manually-operated means secured to said clutch sleeve for manually axially releasing the latter from said driven sleeve and rotating said clutch sleeve and drive shaft independently of said power-operated means.

References Cited in the file of this patent

UNITED STATES PATENTS

| 1,858,624 | Hess et al. | May 17, 1932 |
| 1,988,590 | Geiger | Jan. 22, 1935 |
| 2,324,742 | Voorhees et al. | July 20, 1943 |
| 2,360,461 | Ackerman | Oct. 17, 1944 |
| 2,373,085 | Ackerman et al. | Apr. 10, 1945 |
| 2,390,634 | Aufiero | Dec. 11, 1945 |
| 2,457,211 | De Smet et al. | Dec. 28, 1948 |
| 2,621,544 | Rossmann | Dec. 16, 1952 |
| 2,732,444 | King | Jan. 24, 1956 |

FOREIGN PATENTS

| 686,222 | Germany | Jan. 5, 1940 |